(12) United States Patent
Hasegawa et al.

(10) Patent No.: US 11,648,822 B2
(45) Date of Patent: May 16, 2023

(54) HEAT MANAGEMENT DEVICE

(71) Applicants: TOYOTA JIDOSHA KABUSHIKI KAISHA, Toyota (JP); SUBARU CORPORATION, Tokyo (JP)

(72) Inventors: Yoshio Hasegawa, Toyota (JP); Hiroki Tashiro, Nisshin (JP); Makoto Ikegami, Obu (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 130 days.

(21) Appl. No.: 17/210,074

(22) Filed: Mar. 23, 2021

(65) Prior Publication Data

US 2021/0300154 A1    Sep. 30, 2021

(30) Foreign Application Priority Data

Mar. 27, 2020    (JP) ............................. JP2020-058652

(51) Int. Cl.
*B60H 1/32*    (2006.01)
*B60H 1/00*    (2006.01)

(52) U.S. Cl.
CPC ....... *B60H 1/3227* (2013.01); *B60H 1/00428* (2013.01)

(58) Field of Classification Search
CPC .............. B60H 1/3227; B60H 1/32284; B60H 1/00428; B60H 1/22; B60H 1/2215; B60H 1/2221; B60H 1/00728
See application file for complete search history.

(56) References Cited

U.S. PATENT DOCUMENTS

| | | |
|---|---|---|
| 2001/0040061 A1 | 11/2001 | Matuda et al. |
| 2018/0258874 A1 | 9/2018 | Okamoto et al. |
| 2019/0078497 A1 | 3/2019 | Enomoto et al. |
| 2020/0274210 A1* | 8/2020 | Bae ..................... H01M 10/613 |
| 2020/0290426 A1* | 9/2020 | Aikawa .............. B60H 1/00428 |
| 2020/0324611 A1* | 10/2020 | Yano ....................... B60H 1/004 |
| 2021/0101448 A1* | 4/2021 | Hirai .................. B60H 1/00328 |
| 2021/0316597 A1* | 10/2021 | Okamura ........... B60H 1/32284 |

FOREIGN PATENT DOCUMENTS

| | | |
|---|---|---|
| JP | 2001-037009 A | 2/2001 |
| JP | 2017/106402 A | 6/2017 |
| JP | 2017-150352 A | 8/2017 |

\* cited by examiner

*Primary Examiner* — Marc E Norman
(74) *Attorney, Agent, or Firm* — Oliff PLC

(57) ABSTRACT

A heat management device may include: a first heat circuit in which first heat medium circulates; a second heat circuit in which second heat medium circulates; a first radiator disposed in the first heat circuit; a second radiator disposed in the second heat circuit; and vehicle equipment exchanging heat with the first heat medium. The first and the second radiator may be disposed such that the first heat medium and the second heat medium are able to exchange heat with each other, the first heat medium may be heated by heat exchange between the first and the second heat medium in a case where a temperature of the second heat medium flowing into the second radiator is higher than a temperature of the first heat medium flowing into the first radiator, and the first heat medium heats the vehicle equipment by exchanging heat with the vehicle equipment.

3 Claims, 10 Drawing Sheets

HEAT MANAGEMENT DEVICE

CROSS-REFERENCE TO RELATED APPLICATION(S)

This application claims priority to Japanese Patent Application No. 2020-058652 filed on Mar. 27, 2020, the contents of which are hereby incorporated by reference into the present application.

TECHNICAL FIELD

The technology disclosed herein relates to a heat management device.

Japanese Patent Application Publication No. 2017-150352 describes a heat management device configured to be mounted on a vehicle. The heat management device includes a plurality of heat circuits (a heater circuit, an engine circuit, and others) in each of which heat medium circulates. For example, the heat management device heats a cabin of the vehicle by utilizing the heat medium in the heater circuit as a heat source. Moreover, the heat management device cools an engine by the heat medium in the engine circuit. The heat medium in the engine circuit is cooled by a radiator.

SUMMARY

Some vehicle equipment mounted on a vehicle may decrease in resistance and efficiency at a low temperature. A configuration for heating the vehicle equipment is disposed in the vehicle. The present disclosure proposes a technology that enables heating of vehicle equipment by utilizing heat generated in a vehicle.

A heat management device disclosed herein is configured to be mounted on a vehicle. The heat management device may comprise: a first heat circuit in which first heat medium circulates; a second heat circuit in which second heat medium circulates; a first radiator disposed in the first heat circuit; a second radiator disposed in the second heat circuit; and vehicle equipment configured to exchange heat with the first heat medium, wherein the first radiator and the second radiator are disposed such that the first heat medium flowing in the first heat circuit and the second heat medium flowing in the second heat circuit are able to exchange heat with each other, the first heat medium flowing in the first radiator is heated by heat exchange between the first heat medium and the second heat medium in a case where a temperature of the second heat medium flowing into the second radiator is higher than a temperature of the first heat medium flowing into the first radiator, and the first heat medium heats the vehicle equipment by exchanging heat with the vehicle equipment.

According to this configuration, the vehicle equipment can be heated utilizing heat of the second heat circuit having a relatively high temperature. This enables heating of the first heat medium by utilizing heat generated in the vehicle, with no use of a heating device, such as a heater, dedicated to heating of the first heat medium.

DETAILED DESCRIPTION

Technological elements of a heat management device disclosed herein will be listed below. The technological elements below are independently useful.

In an aspect of the heat management device disclosed herein, the second radiator may be disposed frontward of the first radiator in the vehicle.

In this configuration, air flows from the second radiator toward the first radiator while the vehicle drives. According to this configuration, air flowing toward the second radiator while the vehicle drives may facilitate heat of the second heat medium that flows in the second radiator to be transferred to the first radiator. This enables efficient heating of the first heat medium by heat of the second heat medium.

An aspect of the heat management device disclosed herein may further comprise: a heater configured to heat the second heat medium; and heating apparatus configured to heat air in a cabin of the vehicle using the second heat medium as a heat source. According to this configuration, the second heat medium can be heated utilizing heat of the heater used for heating air in the cabin of the vehicle.

In an aspect of the heat management device disclosed herein, the vehicle equipment may include at least one of a transaxle or a battery configured to supply electric power to a motor for driving the vehicle. According to this configuration, at least one of the battery or the transaxle can be warmed up utilizing the heat management device.

Figure 1:
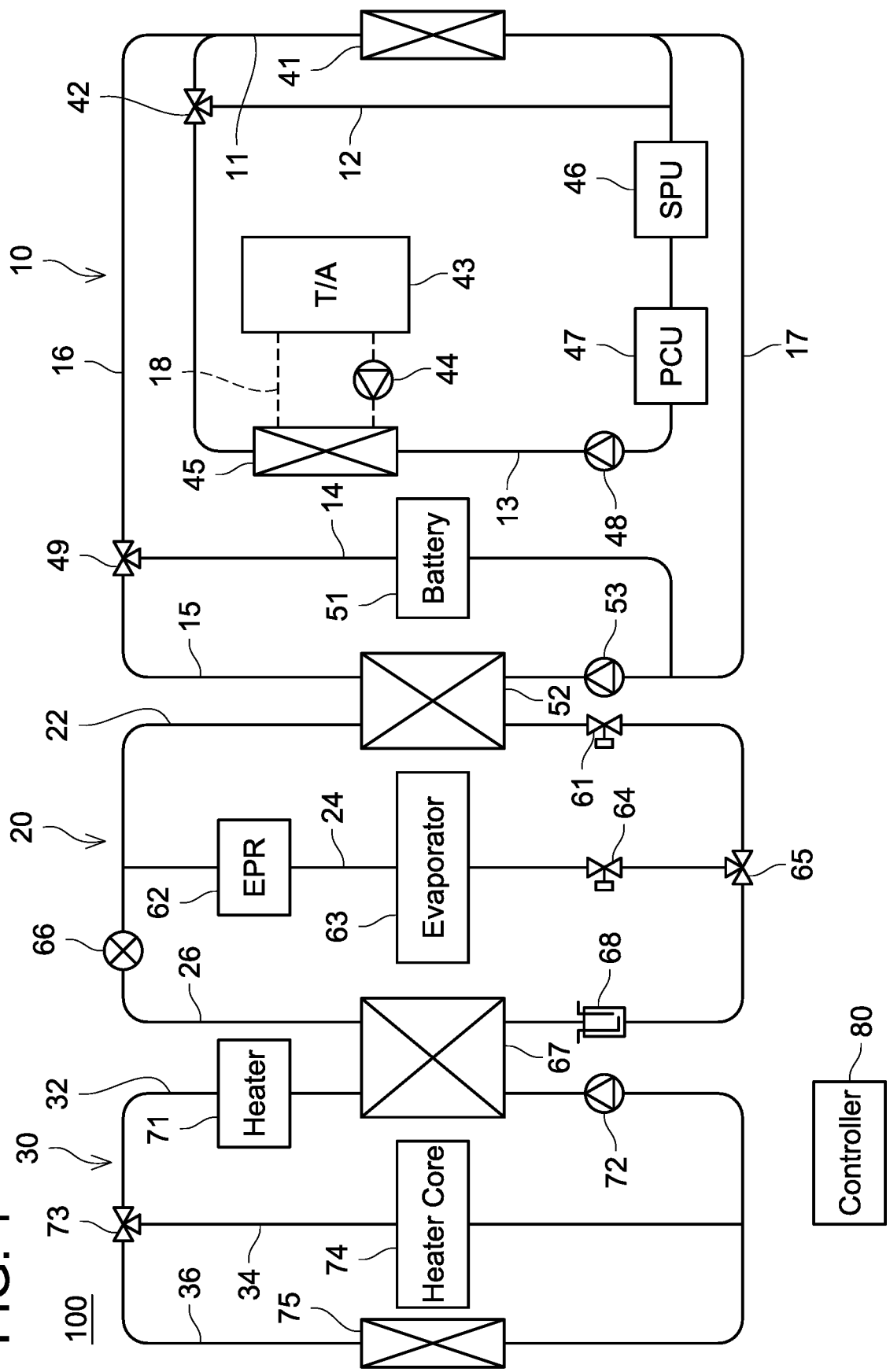
FIG. 1 is a circuit diagram of a heat management device according to an embodiment.

A heat management device 100 according to an embodiment shown in FIG. 1 includes a first heat circuit 10, a second heat circuit 20, and a third heat circuit 30. Heat media respectively flow in the first heat circuit 10, the second heat circuit 20, and the third heat circuit 30. Respective channels of the first heat circuit 10, the second heat circuit 20, and the third heat circuit 30 in which the heat media flow are independent from each other. The respective heat media in the first heat circuit 10, the second heat circuit 20, and the third heat circuit 30 may be constituted of the same material or different materials. Hydrofluorocarbons can be used as the heat media, for example. The heat management device 100 is configured to be mounted on a vehicle. The heat management device 100 can execute an air-cooling operation of cooling air in a vehicle cabin by using an evaporator 63. Moreover, the heat management device 100 can execute an air-heating operation of heating the air in the vehicle cabin by using a heater core 74. The heat management device 100 can cool a battery 51, a transaxle 43, a power control unit (PCU) 47, and a smart power unit (SPU) 46. Furthermore, the heat management device 100 can heat the battery 51, the transaxle 43, the PCU 47, and the SPU 46.

The first heat circuit 10 includes a low-temperature radiator passage 11, a bypass passage 12, an electrical apparatus passage 13, a battery passage 14, a chiller passage 15, a connection passage 16, and a connection passage 17.

A low-temperature radiator 41 is disposed in the low-temperature radiator passage 11. The low-temperature radiator 41 is configured to exchange heat between the heat medium in the low-temperature radiator passage 11 and outside air (i.e., air outside the vehicle). In a case where a temperature of the outside air is lower than a temperature of the heat medium in the low-temperature radiator passage 11, the heat medium in the low-temperature radiator passage 11 is cooled by the low-temperature radiator 41. In a case where the temperature of the outside air is higher than the temperature of the heat medium in the low-temperature radiator passage 11, the heat medium in the low-temperature radiator passage 11 is heated by the low-temperature radiator 41.

A downstream end of the electrical apparatus passage 13 is connected to an upstream end of the bypass passage 12 and an upstream end of the low-temperature radiator passage 11 via a three-way valve 42. An upstream end of the electrical apparatus passage 13 is connected to a downstream end of the bypass passage 12 and a downstream end of the low-temperature radiator passage 11. A pump 48 is disposed in the electrical apparatus passage 13. The pump 48 pumps out the heat medium in the electrical apparatus passage 13 downstream. The three-way valve 42 is configured to switch channels to switch states between a state where the heat medium flows from the electrical apparatus passage 13 to the low-temperature radiator passage 11 and a state where the heat medium flows from the electrical apparatus passage 13 to the bypass passage 12. When the pump 48 operates while the three-way valve 42 connects the electrical apparatus passage 13 to the low-temperature radiator passage 11, the heat medium circulates in a circulation channel configured with the electrical apparatus passage 13 and the low-temperature radiator passage 11. When the pump 48 operates while the three-way valve 42 connects the electrical apparatus passage 13 to the bypass passage 12, the heat medium circulates in a circulation channel configured with the electrical apparatus passage 13 and the bypass passage 12.

The SPU 46, the PCU 47, and an oil cooler 45 are disposed in the electrical apparatus passage 13. The SPU 46 and the PCU 47 are disposed upstream of the pump 48, and the oil cooler 45 is disposed downstream of the pump 48. The SPU 46 and the PCU 47 are configured to be heated or cooled by heat exchange with the heat medium in the electrical apparatus passage 13. The oil cooler 45 is a heat exchanger. An oil-circulation path 18 is connected to the oil cooler 45. The oil cooler 45 heats or cools oil in the oil-circulation path 18 by heat exchange between the heat medium in the electrical apparatus passage 13 and the oil in the oil-circulation path 18. The oil-circulation path 18 is disposed to pass through the transaxle 43. The transaxle 43 has a motor built therein. The motor built in the transaxle 43 is a traction motor configured to rotate a drive wheel of the vehicle. A part of the oil-circulation path 18 is configured with a sliding portion (i.e., a bearing) of the motor. In other words, the oil in the oil-circulation path 18 is lubricating oil for the inside of the motor. An oil pump 44 is disposed in the oil-circulation path 18. The oil pump 44 circulates the oil in the oil-circulation path 18. When the oil cooled by the oil cooler 45 circulates in the oil-circulation path 18, the motor built in the transaxle 43 is cooled. The SPU 46 controls charging and discharging of the battery 51. The PCU 47 converts DC power provided from the battery 51 into AC power and provides the AC power to the motor built in the transaxle 43.

A downstream end of the chiller passage 15 is connected to an upstream end of the battery passage 14 and an upstream end of the connection passage 16 via a three-way valve 49. An upstream end of the chiller passage 15 is connected to a downstream end of the battery passage 14 and a downstream end of the connection passage 17. An upstream end of the connection passage 17 is connected to a downstream end of the connection passage 16 by the low-temperature radiator passage 11. A pump 53 is disposed in the chiller passage 15. The pump 53 pumps out the heat medium in the chiller passage 15 downstream. The three-way valve 49 is configured to switch channels to switch states between a state where the heat medium flows from the chiller passage 15 to the battery passage 14 and a state where the heat medium flows from the chiller passage 15 to the connection passage 16. When the pump 53 operates while the three-way valve 49 connects the chiller passage 15 to the battery passage 14, the heat medium circulates in a circulation channel configured with the chiller passage 15 and the battery passage 14. When the pump 53 operates while the three-way valve 49 connects the chiller passage 15 to the connection passage 16, the heat medium circulates in a circulation channel configured with the chiller passage 15, the connection passage 16, the low-temperature radiator passage 11, and the connection passage 17.

A chiller 52 is disposed in the chiller passage 15. The chiller 52 is disposed downstream of the pump 53. The chiller 52 is configured to cool the heat medium in the chiller passage 15 by heat exchange between the heat medium in the chiller passage 15 and the heat medium in the second heat circuit 20 (more specifically, in a chiller passage 22 described below).

The battery 51 is disposed in the battery passage 14. The battery 51 is configured to provide DC power to the PCU 47. In other words, the battery 51 is configured to provide power to the motor built in the transaxle 43 via the PCU 47. The battery 51 is cooled by heat exchange with the heat medium in the battery passage 14.

The second heat circuit 20 includes the chiller passage 22, an evaporator passage 24, and a condenser passage 26. A downstream end of the condenser passage 26 is connected to an upstream end of the chiller passage 22 and an upstream end of the evaporator passage 24 via a three-way valve 65. An upstream end of the condenser passage 26 is connected to a downstream end of the chiller passage 22 and a downstream end of the evaporator passage 24. A compressor 66 is disposed in the condenser passage 26. The compressor 66 supplies the heat medium in the condenser passage 26 downstream while compressing the heat medium. The three-way valve 65 switches channels to switch states between a state where the heat medium flows from the condenser passage 26 to the chiller passage 22 and a state where the heat medium flows from the condenser passage 26 to the evaporator passage 24. When the compressor 66 operates while the three-way valve 65 connects the condenser passage 26 to the chiller passage 22, the heat medium circulates in a circulation channel configured with the condenser passage 26 and the chiller passage 22. When the compressor 66 operates while the three-way valve 65 connects the condenser passage 26 to the evaporator passage 24, the heat medium circulates in a circulation channel configured with the condenser passage 26 and the evaporator passage 24.

A condenser 67 and a modulator 68 are disposed in the condenser passage 26. The condenser 67 is disposed downstream of the compressor 66, and the modulator 68 is disposed downstream of the condenser 67. The heat medium supplied by the compressor 66 is a high-temperature gas. The heat medium which is a high-temperature gas thus flows into the condenser 67. The condenser 67 is configured to cool the heat medium in the condenser passage 26 by heat exchange between the heat medium in the condenser passage 26 and the heat medium in the third heat circuit 30 (more specifically, in a condenser passage 32 described below). The heat medium in the condenser passage 26 condenses by being cooled in the condenser 67. The heat medium that has passed through the condenser 67 is therefore a low-temperature liquid. The heat medium which is a low-temperature liquid therefore flows into the modulator 68. The modulator 68 removes air bubbles from the heat medium which is a liquid.

An expansion valve 61 and the chiller 52 are disposed in the chiller passage 22. The chiller 52 is disposed downstream of the expansion valve 61. The heat medium that has passed through the modulator 68 (i.e., the heat medium that is a low-temperature liquid) flows into the expansion valve 61. The heat medium is decompressed as passing through the expansion valve 61. The heat medium that is a low-pressure and low-temperature liquid therefore flows into the chiller 52. The chiller 52 heats the heat medium in the chiller passage 22 and cools the heat medium in the chiller passage 15 by heat exchange between the heat medium in the chiller passage 22 and the heat medium in the chiller passage 15. In the chiller 52, the heat medium in the chiller passage 22 is heated to thereby evaporate. The heat medium in the chiller passage 22 thus efficiently absorbs heat from the heat medium in the chiller passage 15. The heat medium in the chiller passage 15 is thereby cooled efficiently. The heat medium in the chiller passage 22 that has passed through the chiller 52 (i.e., the heat medium that is a high-temperature gas) is compressed by the compressor 66 and transferred to the condenser 67.

An expansion valve 64, the evaporator 63, and an evaporator pressure regulator (EPR) 62 are disposed in the evaporator passage 24. The evaporator 63 is disposed downstream of the expansion valve 64, and the EPR 62 is disposed downstream of the evaporator 63. The heat medium that has passed through the modulator 68 (i.e., the heat medium that is a low-temperature liquid) flows into the expansion valve 64. The heat medium is decompressed when passing through the expansion valve 64. The heat medium that is a low-pressure and low-temperature liquid therefore flows into the evaporator 63. The evaporator 63 heats the heat medium and cools the air in the vehicle cabin by heat exchange between the heat medium in the evaporator passage 24 and the air in the vehicle cabin. In other words, the evaporator 63 executes air-cooling in the vehicle cabin. In the evaporator 63, the heat medium is heated by heat exchange to thereby evaporate. The heat medium thus efficiently absorbs heat from the air in the vehicle cabin. The air in the vehicle cabin is thereby cooled efficiently. The EPR 62 controls the flow rate of the heat medium in the evaporator passage 24 to control the pressure in the evaporator 63 to be approximately constant. The heat medium that has passed through the EPR 62 (i.e., the heat medium that is a high-temperature gas) is compressed by the compressor 66 and transferred to the condenser 67.

The third heat circuit 30 includes the condenser passage 32, a heater core passage 34, and a high-temperature radiator passage 36. A downstream end of the condenser passage 32 is connected to an upstream end of the heater core passage 34 and an upstream end of the high-temperature radiator passage 36 via a three-way valve 73. An upstream end of the condenser passage 32 is connected to a downstream end of the heater core passage 34 and a downstream end of the high-temperature radiator passage 36. A pump 72 is disposed in the condenser passage 32. The pump 72 pumps out the heat medium in the condenser passage 32 downstream. The three-way valve 73 switches channels to switch states between a state where the heat medium flows from the condenser passage 32 to the heater core passage 34 and a state where the heat medium flows from the condenser passage 32 to the high-temperature radiator passage 36. When the pump 72 operates while the three-way valve 73 connects the condenser passage 32 to the heater core passage 34, the heat medium circulates in a circulation channel configured with the condenser passage 32 and the heater core passage 34. When the pump 72 operates while the three-way valve 73 connects the condenser passage 32 to the high-temperature radiator passage 36, the heat medium circulates in a circulation channel configured with the condenser passage 32 and the high-temperature radiator passage 36.

The condenser 67 and a heater 71 are disposed in the condenser passage 32. The condenser 67 is disposed downstream of the pump 72, and the heater 71 is disposed downstream of the condenser 67. The condenser 67 heats the heat medium in the condenser passage 32 and cools the heat medium in the condenser passage 26 by heat exchange between the heat medium in the condenser passage 32 and the heat medium in the condenser passage 26. The heater 71 is an electric heater and is configured to heat the heat medium in the condenser passage 32.

The heater core 74 is disposed in the heater core passage 34. The heater core 74 is configured to heat the air in the vehicle cabin by heat exchange between the heat medium in the heater core passage 34 and the air in the vehicle cabin. In other words, the heater core 74 executes air-heating in the vehicle cabin.

A high-temperature radiator 75 is disposed in the high-temperature radiator passage 36. The high-temperature radiator 75 cools the heat medium in the high-temperature radiator passage 36 by heat exchange between the heat medium in the high-temperature radiator passage 36 and the outside air.

The heat management device 100 includes a controller 80. The controller 80 is configured to control each part of the heat management device 100.

Figure 2:
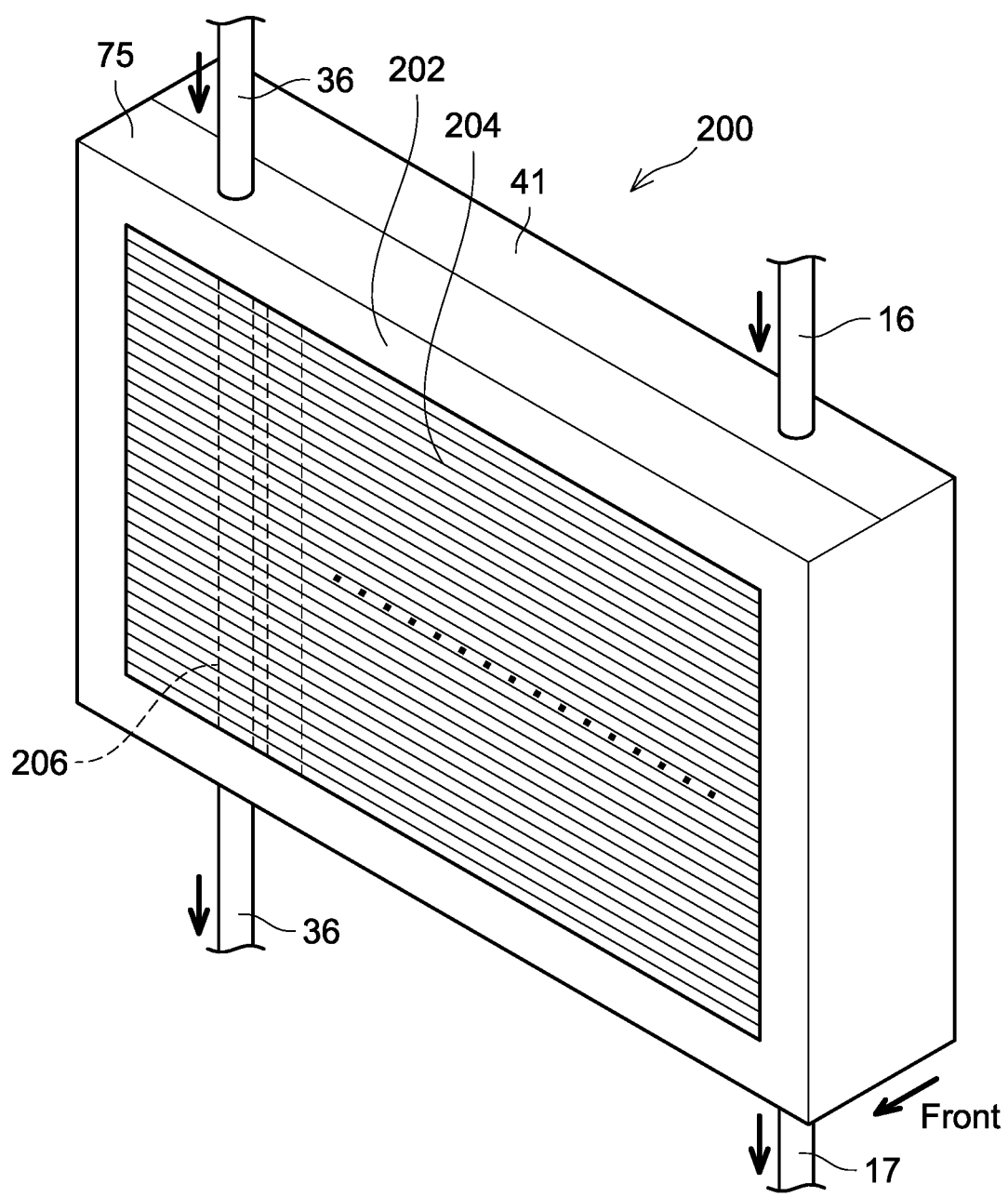
FIG. 2 is a perspective view of a radiator unit.

(Configurations of Radiators) Next, configurations of the low-temperature radiator 41 and the high-temperature radiator 75 will be described. For improved drawing legibility, the above-described circuit diagram shows the low-temperature radiator 41 and the high-temperature radiator 75 at positions away from each other. As shown in FIG. 2, however, the low-temperature radiator 41 and the high-temperature radiator 75 are integrally disposed as a radiator unit 200. The radiator unit 200 includes a frame 202, a plurality of fins 204, a plurality of high-temperature pipes 206, and a plurality of low-temperature pipes 208. The frame 202 configures a frame of the radiator unit 200. The high-temperature radiator passage 36 and the connection passages 16, 17 are attached to the frame 202.

The plurality of high-temperature pipes 206 that communicates with the high-temperature radiator passage 36 is supported by the frame 202. The plurality of high-temperature pipes 206 is disposed in parallel with the high-temperature radiator passage 36. Each high-temperature pipe 206 extends in an up-down direction. The high-temperature pipes 206 are disposed in parallel with and spaced apart from each other. Although FIG. 2 shows two of the high-temperature pipes 206 alone for improved drawing legibility, more than two high-temperature pipes 206 are disposed in a vehicle width direction of the frame 200. The heat medium flowing from the high-temperature radiator passage 36, which is attached to an upper end of the frame 202, flows in the plurality of high-temperature pipes 206 from top to bottom. At lower ends of the plurality of high-temperature pipes 206, the heat medium flows out of the radiator unit 200 from the high-temperature radiator passage 36 which is attached to a lower end of the frame 202.

The plurality of low-temperature pipes 208 (see FIG. 3) that communicates with the connection passages 16, 17 is further supported by the frame 202. The plurality of low-temperature pipes 208 is disposed in parallel with the connection passages 16, 17. The plurality of low-temperature pipes 208 is disposed rearward of the plurality of high-temperature pipes 206 in the vehicle. The low-temperature pipes 208 extend in parallel with the high-temperature pipes 206 in the up-down direction. The low-temperature pipes 208 are disposed in parallel with and spaced apart from each other. The heat medium flowing from the connection passage 16, which is attached to the upper end of the frame 202, flows in the plurality of low-temperature pipes 208 from top to bottom. At lower ends of the plurality of low-temperature pipes 208, the heat medium flows out of the radiator unit 200 from the connection passage 17 which is attached to the lower end of the frame 202.

Figure 3:
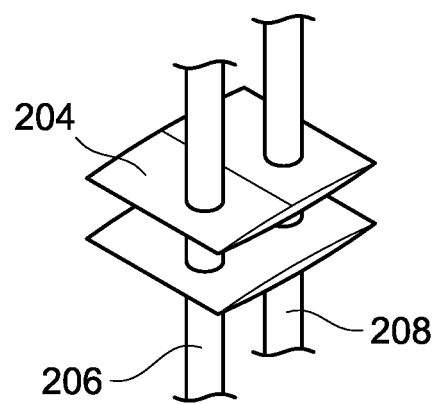
FIG. 3 is a perspective view showing a relation among a fin, a high-temperature pipe, and a low-temperature pipe.

The plurality of fins 204 is supported by the frame 202. The plurality of fins 204 extends in a direction orthogonal to the high-temperature pipes 206 and the low-temperature pipes 208, namely, in a direction perpendicular to the up-down direction. The fins 204 are disposed in parallel with and spaced apart from each other. FIG. 3 is a partial perspective view showing two of the fins 204, one of the high-temperature pipes 206, and one of the low-temperature pipes 208. The plurality of high-temperature pipes 206 and the plurality of low-temperature pipes 208 penetrate each of the fins 204. Each of the fins 204 is in contact with the plurality of high-temperature pipes 206 and the plurality of low-temperature pipes 208 that penetrate the fin 204.

In the radiator unit 200, as described above, the plurality of high-temperature pipes 206 is disposed toward the front of the vehicle and the plurality of low-temperature pipes 208 is disposed toward the rear of the vehicle. Thus, a portion of the radiator unit 200 disposed toward the front of the vehicle can be termed the high-temperature radiator 75, and a portion of the radiator unit 200 disposed toward the rear of the vehicle can be termed the low-temperature radiator 41.

Next, operations that can be executed by the controller 80 will be described. The controller 80 can execute an air-heating operation, an air-cooling operation, a battery-cooling operation, an electrical apparatus-cooling operation, and a vehicle equipment-heating operation.

Figure 4:
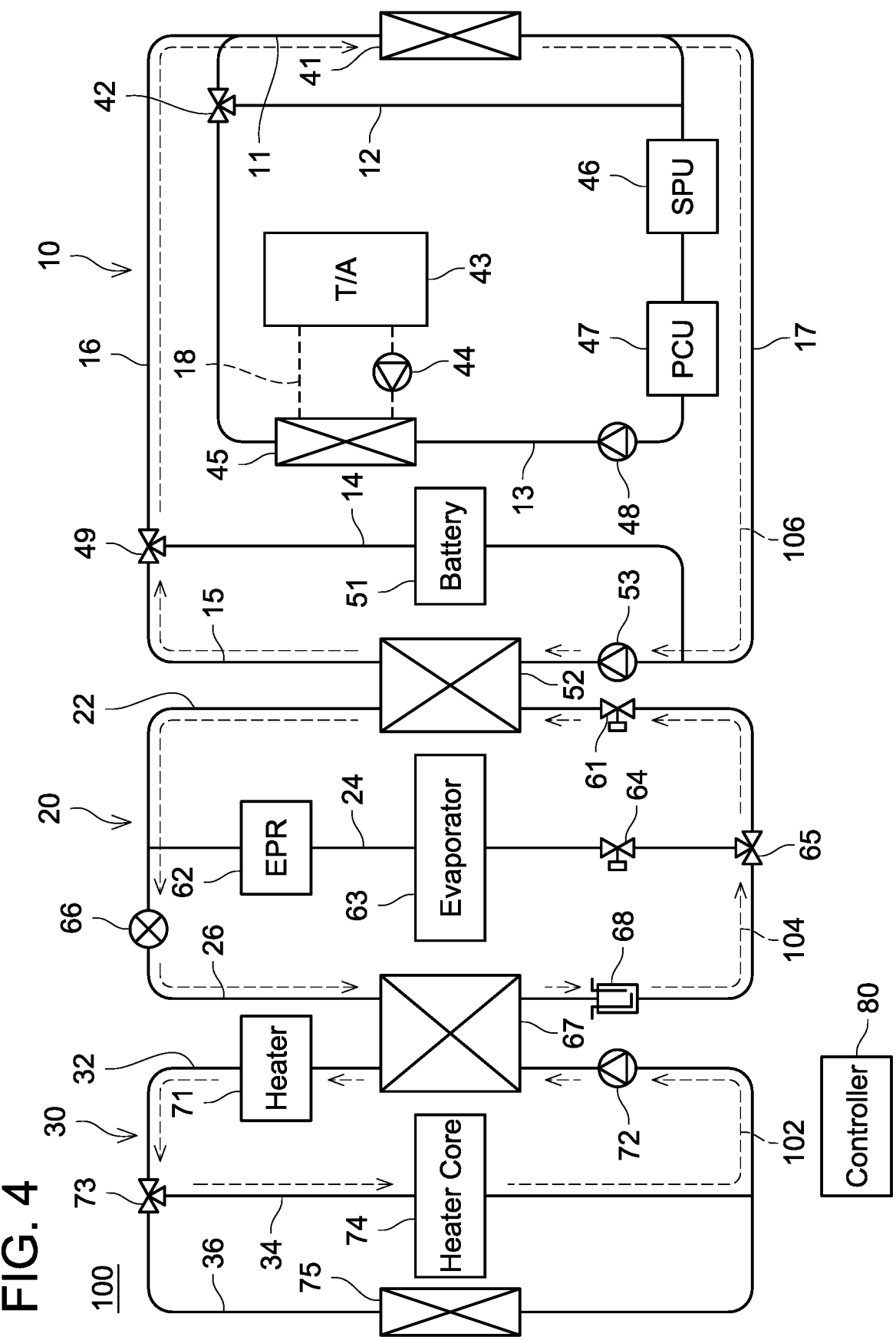
FIG. 4 is a circuit diagram showing an air-heating operation.

(Air-Heating Operation) In the air-heating operation the controller 80 controls each part of the heat management device 100 as shown in FIG. 4. In the third heat circuit 30, the three-way valve 73 is controlled to connect the condenser passage 32 to the heater core passage 34, and the pump 72 operates. The heat medium therefore circulates in a circulation channel 102 configured with the condenser passage 32 and the heater core passage 34. In the second heat circuit 20, the three-way valve 65 is controlled to connect the condenser passage 26 to the chiller passage 22, and the compressor 66 operates. The heat medium therefore circulates in a circulation channel 104 configured with the condenser passage 26 and the chiller passage 22. In the first heat circuit 10, the three-way valve 49 is controlled to connect the chiller passage 15 to the connection passage 16, and the pump 53 operates. The pump 48 is in a stopped state. The heat medium therefore circulates in a circulation channel 106 configured with the chiller passage 15, the connection passage 16, the low-temperature radiator passage 11, and the connection passage 17.

In the circulation channel 106 in FIG. 4, the low-temperature heat medium cooled by the chiller 52 flows into the low-temperature radiator 41. The temperature of the heat medium flowing into the low-temperature radiator 41 is therefore lower than the temperature of the outside air. The heat medium is thus heated in the low-temperature radiator 41. Consequently, the high-temperature heat medium heated by the low-temperature radiator 41 flows into the chiller 52.

In the chiller 52, the heat medium in the chiller passage 15 (i.e., the circulation channel 106) is cooled and the heat medium in the chiller passage 22 (i.e., the circulation channel 104) is heated. In the circulation channel 104, therefore, the high-temperature heat medium heated by the chiller 52 flows into the condenser 67. In the condenser 67, the heat medium in the condenser passage 26 (i.e., the circulation channel 104) is cooled and the heat medium in the condenser passage 32 (i.e., the circulation channel 102) is heated. In the circulation channel 102, therefore, the high-temperature heat medium heated by the condenser 67 flows into the heater core 74. The heater core 74 heats the air in the cabin of the vehicle by heat exchange between the heat medium in the circulation passage 102 and the air in the cabin of the vehicle. The air heated by the heater core 74 is blown by a fan (not shown). As described above, heating of the cabin of the vehicle is executed. As is clear from the above description, heat is supplied to the heater core 74 via the heat medium in the circulation channel 104 (i.e., the heat medium in the second heat circuit 20). In other words, in the air-heating operation, the heater core 74 executes air-heating using the heat medium in the second heat circuit 20 as a heat source.

Figure 5:
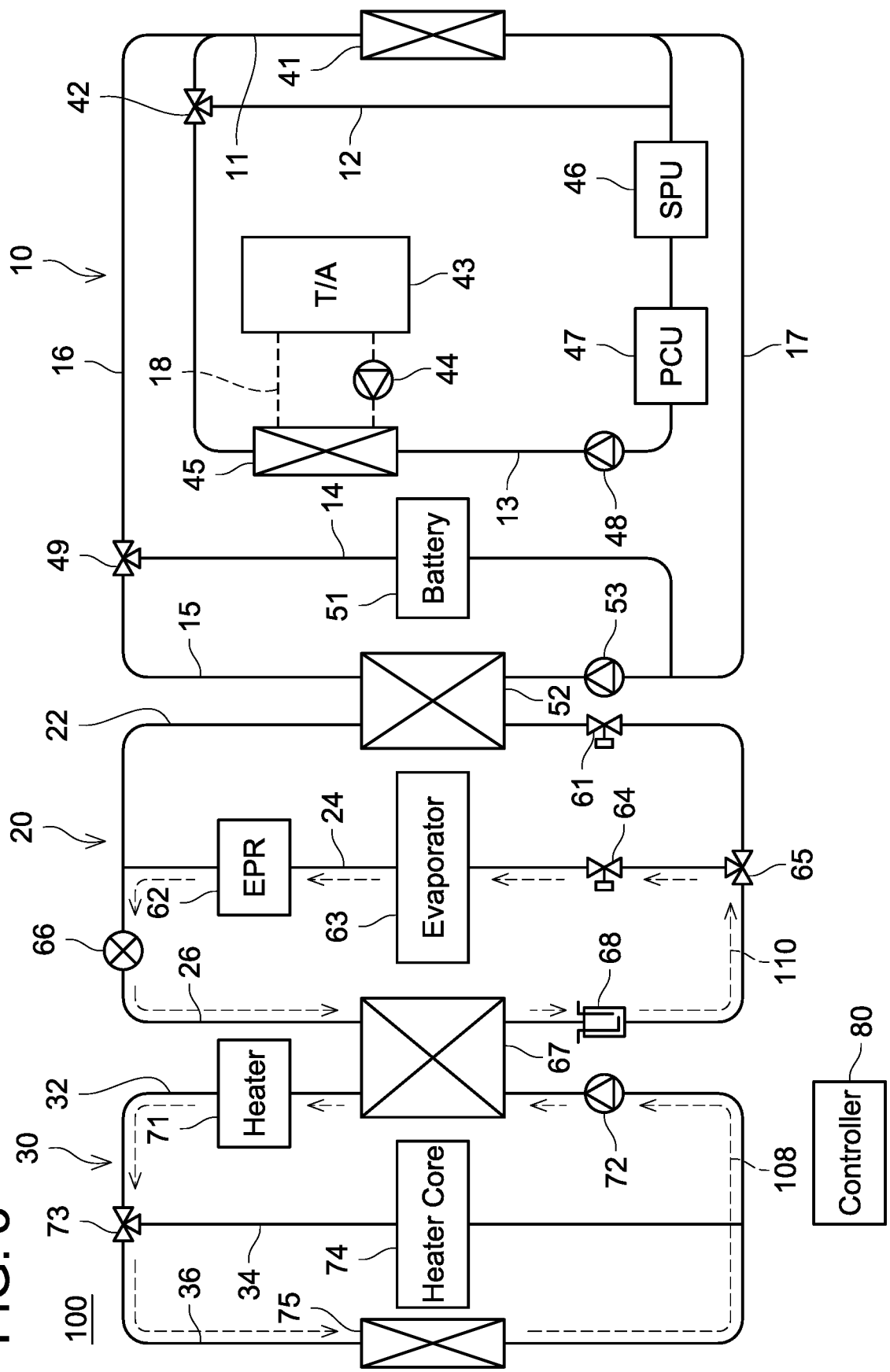
FIG. 5 is a circuit diagram showing an air-cooling operation.

(Air-Cooling Operation) In the air-cooling operation the controller 80 controls each part of the heat management device 100 as shown in FIG. 5. In the third heat circuit 30, the three-way valve 73 is controlled to connect the condenser passage 32 to the high-temperature radiator passage 36, and the pump 72 operates. The heat medium therefore circulates in a circulation channel 108 configured with the condenser passage 32 and the high-temperature radiator passage 36. In the second heat circuit 20, the three-way valve 65 is controlled to connect the condenser passage 26 to the evaporator passage 24, and the compressor 66 operates. The heat medium therefore circulates in a circulation channel 110 configured with the condenser passage 26 and the evaporator passage 24. The first heat circuit 10 is not involved in the air-cooling operation.

In the circulation passage 108 in FIG. 5, the high-temperature heat medium heated by the condenser 67 flows into the high-temperature radiator 75. The temperature of the heat medium flowing into the high-temperature radiator 75 is therefore higher than the temperature of the outside air. The heat medium is thus cooled in the high-temperature radiator 75. Consequently, the low-temperature heat medium cooled by the high-temperature radiator 75 flows into the condenser 67. In the condenser 67, the heat medium in the condenser passage 32 (i.e., the circulation channel 108) is heated and the heat medium in the condenser passage 26 (i.e., the circulation channel 110) is cooled. In the circulation channel 110, therefore, the low-temperature heat medium cooled by the condenser 67 flows into the evaporator 63. The evaporator 63 cools the air in the cabin of the vehicle by heat exchange between the heat medium in the circulation passage 110 and the air in the cabin of the vehicle. The air cooled by the evaporator 63 is blown by a fan (not shown). As described above, air-cooling in the cabin of the vehicle is executed.

Figure 6:
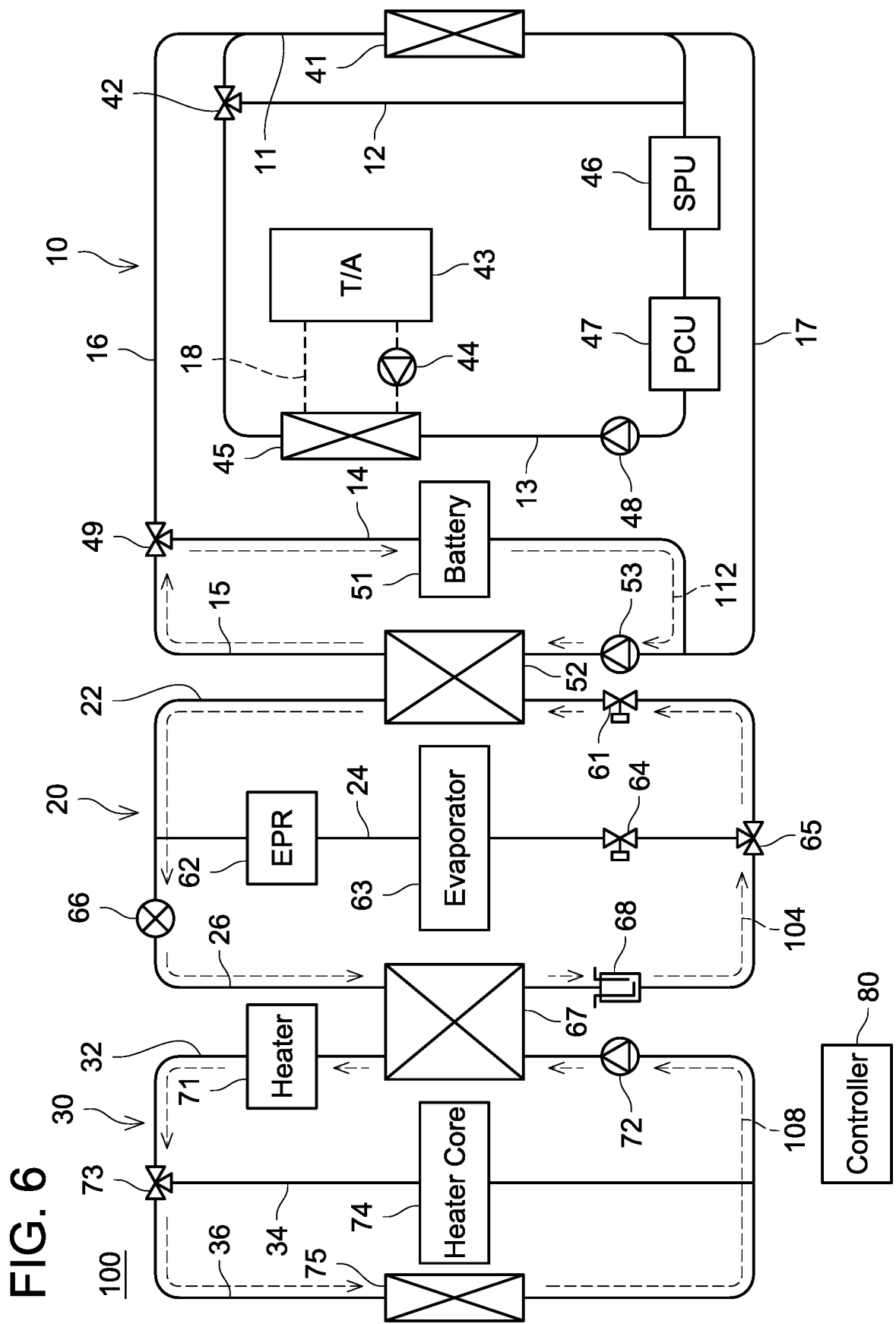
FIG. 6 is a circuit diagram showing a battery-cooling operation.

(Battery-Cooling Operation) The battery-cooling operation is executed when the temperature of the battery 51 rises to a temperature higher than or equal to a reference value. In the battery-cooling operation, the controller 80 controls each part of the heat management device 100 as shown in FIG. 6. In the third heat circuit 30, the three-way valve 73 and the pump 72 are controlled such that the heat medium circulates in the circulation channel 108 configured with the condenser passage 32 and the high-temperature radiator passage 36. In the second heat circuit 20, the three-way valve 65 and the compressor 66 are controlled such that the heat medium circulates in the circulation channel 104 configured with the condenser passage 26 and the chiller passage 22. In the first heat circuit 10, the three-way valve 49 is controlled to connect the chiller passage 15 to the battery passage 14, and the pump 53 operates. The heat medium therefore circulates in a circulation channel 112 configured with the chiller passage 15 and the battery passage 14.

The circulation channel 108 in FIG. 6 operates as in FIG. 5 (i.e., as the air-cooling operation). The heat medium in the condenser passage 26 (i.e., the circulation passage 104) is therefore cooled by the condenser 67. In the circulation passage 104, therefore, the low-temperature heat medium cooled by the condenser 67 flows into the chiller 52. In the chiller 52, the heat medium in the chiller passage 22 (i.e., the circulation channel 104) is heated and the heat medium in the chiller passage 15 (i.e., the circulation channel 112) is cooled. In the circulation passage 112, therefore, the low-temperature heat medium cooled by the chiller 52 flows into the battery passage 14, and the battery 51 is thereby cooled. As described above, cooling of the battery 51 is executed.

In the battery-cooling operation, the heat medium may flow in the heater core passage 34 in place of the high-temperature radiator passage 36. In this case, the heater core 74 cools the heat medium in the third heat circuit 30 and heats the air in the vehicle cabin. In this operation, the battery 51 is cooled and the air in the vehicle cabin is heated by the heater core 74 using waste heat generated from the battery 51.

Figure 7:
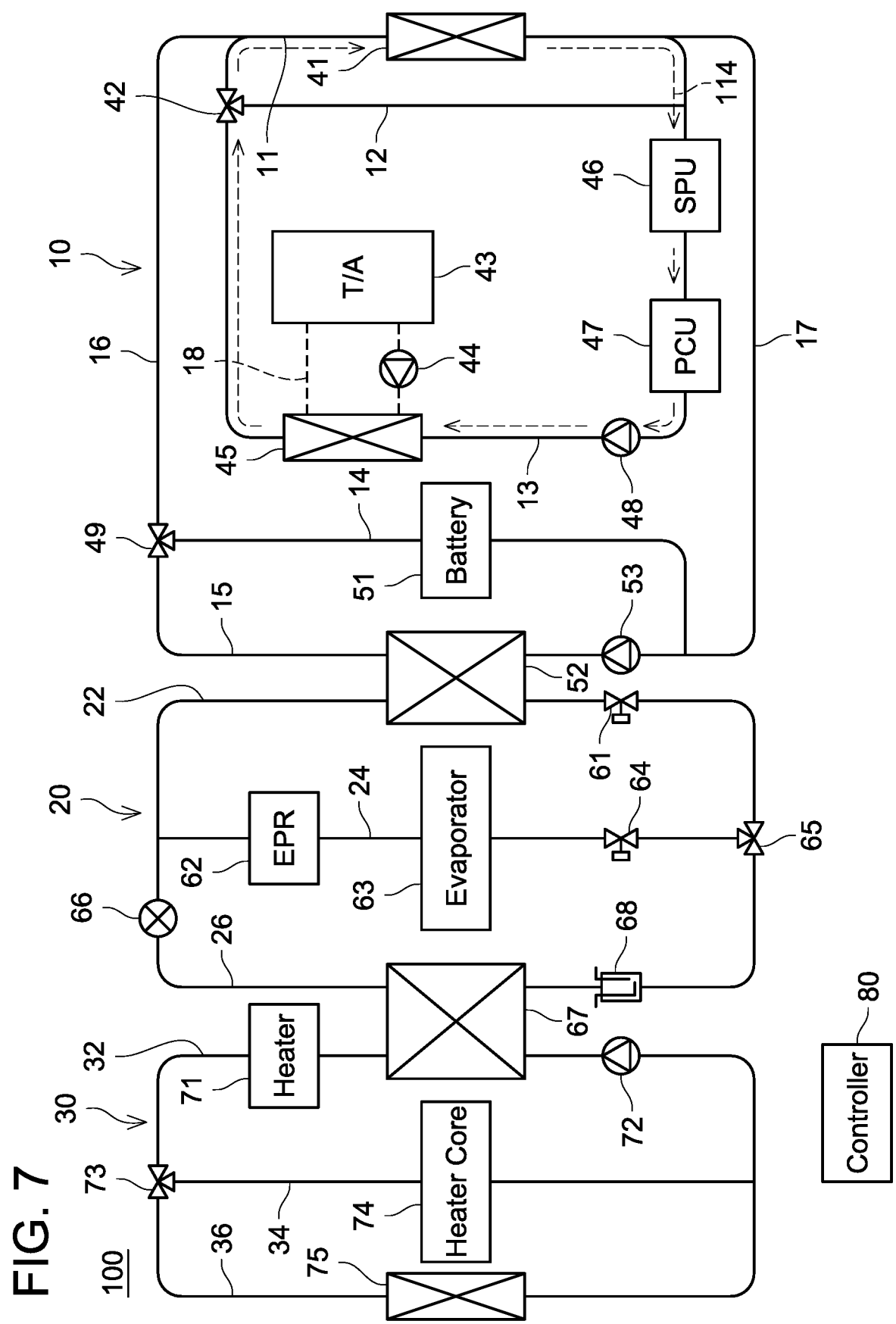
FIG. 7 is a circuit diagram showing an electrical apparatus-cooling operation.

(Electrical Apparatus-Cooling Operation) The electrical apparatus-cooling operation is executed while the SPU 46, the PCU 47, and the motor built in the transaxle 43 operate. The electrical apparatus-cooling operation may be executed when the temperature of at least one of the SPU 46, the PCU 47, and the motor exceeds a reference value. In the electrical apparatus-cooling operation, the controller 80 controls each part of the heat management device 100 as shown in FIG. 7. Neither the third heat circuit 30 nor the second heat circuit 20 is involved in the electrical apparatus-cooling operation. In the first heat circuit 10, the three-way valve 42 is controlled to connect the electrical apparatus passage 13 to the low-temperature radiator passage 11, and the pump 48 operates. The heat medium therefore circulates in a circulation channel 114 configured with the electrical apparatus passage 13 and the low-temperature radiator passage 11. In the electrical apparatus-cooling operation, the oil pump 44 operates and the oil in the oil-circulation path 18 circulates.

In the circulation channel 114, the high-temperature heat medium heated by the SPU 46, the PCU 47, and the oil cooler 45 flows into the low-temperature radiator 41. The temperature of the heat medium flowing into the low-temperature radiator 41 is therefore higher than the temperature of the outside air. The heat medium in the low-temperature radiator passage 11 (i.e., the circulation channel 114) is thus cooled by the low-temperature radiator 41. In the circulation channel 114, therefore, the low-temperature heat medium cooled by the low-temperature radiator 41 flows into the electrical apparatus passage 13, and hence the SPU 46 and the PCU 47 are cooled. The oil cooler 45 cools the oil in the oil-circulation path 18 with the low-temperature heat medium. Consequently, the cooled oil is provided to the motor built in the transaxle 43, and the motor is thereby cooled. As described above, the electrical apparatus-cooling operation to cool the electrical apparatus (i.e., the SPU 46, the PCU 47, and the motor) is executed.

As described above, the circulation channel 112 formed in the first heat circuit 10 in the battery-cooling operation does not include the low-temperature radiator passage 11. Moreover, the circulation channel 114 formed in the first heat circuit 10 in the electrical apparatus-cooling operation does not include the chiller passage 15. The battery-cooling operation and the electrical apparatus-cooling operation can therefore be executed independently with no interference between the circulation channel 112 and the circulation channel 114. For example, the battery-cooling operation can be executed without execution of the electrical apparatus-cooling operation, the electrical apparatus-cooling operation can be executed without execution of the battery-cooling operation, and the battery-cooling operation and the electrical apparatus-cooling operation can be executed simultaneously. Since the circulation channel 112 does not include the electrical apparatus passage 13 and the circulation channel 114 does not include the battery passage 14, the circulation channel 112 and the circulation channel 114 can be separated completely.

The circulation channel 106 formed in the first heat circuit 10 in the air-heating operation includes neither the battery passage 14 nor the electrical apparatus passage 13. This prevents the temperature of the heat medium in the circulation channel 106 from lowering during the air-heating operation due to heat exchange with apparatus not involved in the air-heating operation. The air-heating operation can thereby be executed with higher efficiency.

(Vehicle Equipment-Heating Operation) The vehicle equipment-heating operation includes a battery-heating operation and a unit-heating operation. The battery-heating operation is executed when the temperature of the battery 51 is lower than or equal to a reference value. The unit-heating operation is executed when the temperature of at least one of the SPU 46, the PCU 47, and the transaxle 43 is lower than or equal to a reference value. The vehicle equipment-heating operation may be executed when the vehicle starts driving from a stopped state, or while the vehicle is stopped. As an alternative, the vehicle equipment-heating operation may also be executed in accordance with the temperature of the outside air and/or a period for which the vehicle is stopped.

Figure 8:
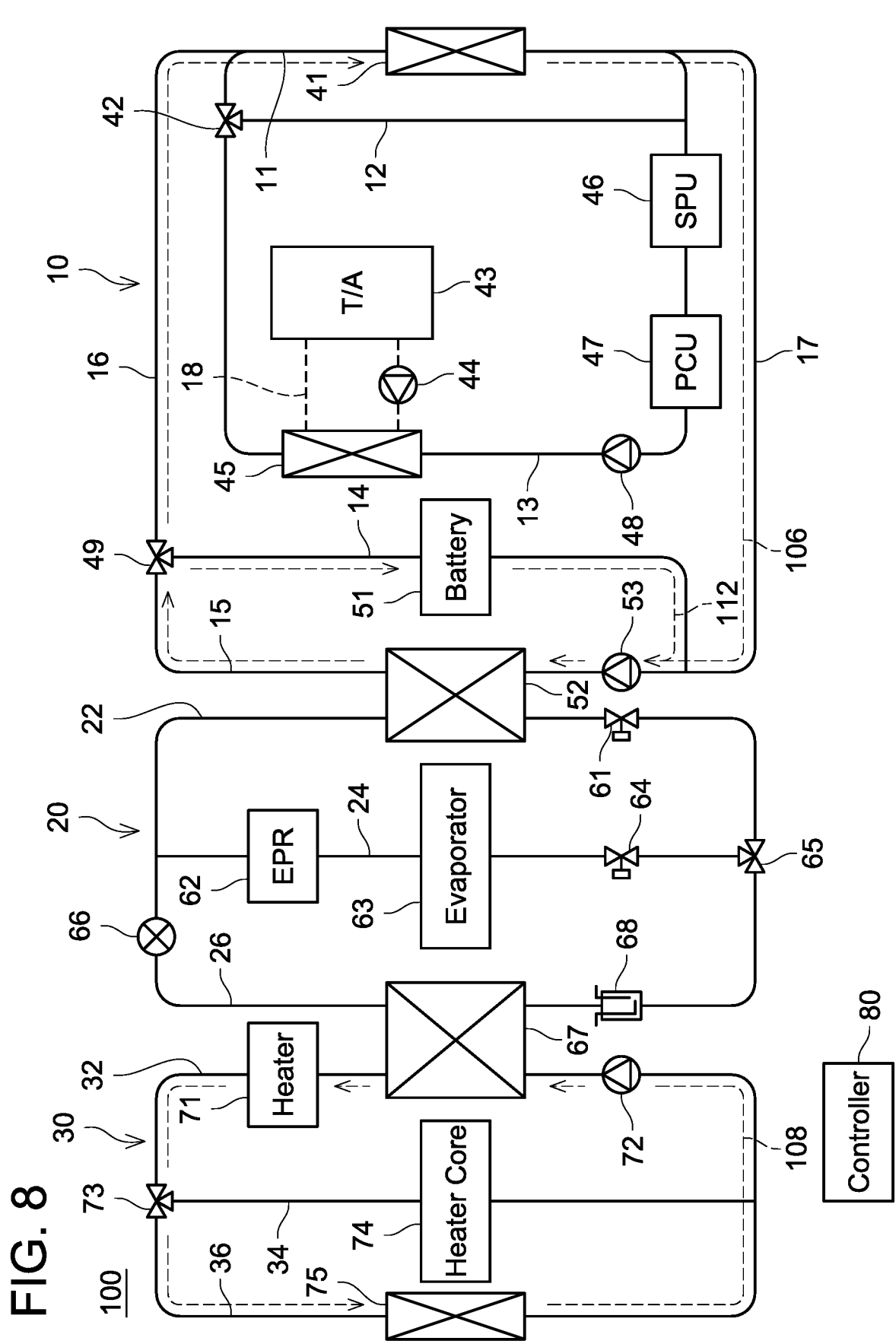
FIG. 8 is a circuit diagram showing a battery-heating operation.

(Battery-Heating Operation) In the battery-heating operation, the controller 80 controls each part of the heat management device 100 as shown in FIG. 8. The second heat circuit 20 is not involved in the battery-heating operation. In the third heat circuit 30, the three-way valve 73 and the pump 72 are controlled such that the heat medium circulates in the circulation channel 108 configured with the condenser passage 32 and the high-temperature radiator passage 36. In the first heat circuit 10, the three-way valve 49 is switched to alternatively establish a state where the chiller passage 15 and the battery passage 14 are connected to each other and a state where the chiller passage 15 and the connection passage 16 are connected to each other, and the pump 53 operates. Therefore, states are alternately switched between a state where the heat medium circulates in the circulation channel 112 configured with the chiller passage 15 and the battery passage 14 and a state where the heat medium circulates in the circulation channel 106 configured with the chiller passage 15, the connection passage 16, the low-temperature radiator passage 11, and the connection passage 17.

In the battery-heating operation, the controller 80 operates the heater 71 to heat the heat medium. In the circulation channel 108 in FIG. 8, the high-temperature heat medium heated by the heater 71 thereby flows into the high-temperature radiator 75. Consequently, in the radiator unit 200, heat of the heat medium that flows in the high-temperature pipes 206 in the high-temperature radiator 75 is transferred to the heat medium that flows in the low-temperature pipes 208. The heat medium that flows in the high-temperature pipes 206 (i.e., the heat medium that circulates in the circulation channel 108) is thereby cooled, and the heat medium that flows in the low-temperature pipes 208 (i.e., the heat medium that circulates in the circulation channel 106) is thereby heated. The high-temperature radiator 75 is disposed frontward of the low-temperature radiator 41 in the vehicle. While the vehicle drives, therefore, air flows from the high-temperature radiator 75 toward the low-temperature radiator 41. This facilitates transfer of heat of the heat medium that flows in the high-temperature radiator 75 to the low-temperature radiator 41. Because of this, the heat medium that flows in the low-temperature radiator 41 can be heated by heat of the heat medium that flows in the high-temperature radiator 75.

Therefore, the high-temperature heat medium heated by the low-temperature radiator 41 flows in the circulation channel 106. The high-temperature heat medium reaches the three-way valve 49. When the three-way valve 49 is switched from the state where the heat medium circulates in the circulation passage 106 to the state where the heat medium circulates in the circulation passage 112, the high-temperature heat medium flows into the battery passage 14, and the battery 51 is thereby heated. As described above, heating of the battery 51 is executed. According to this configuration, warming up the battery 51 can prevent a situation in which the battery 51 has to be used in a limited manner due to the battery 51 being at a low temperature.

Figure 9:
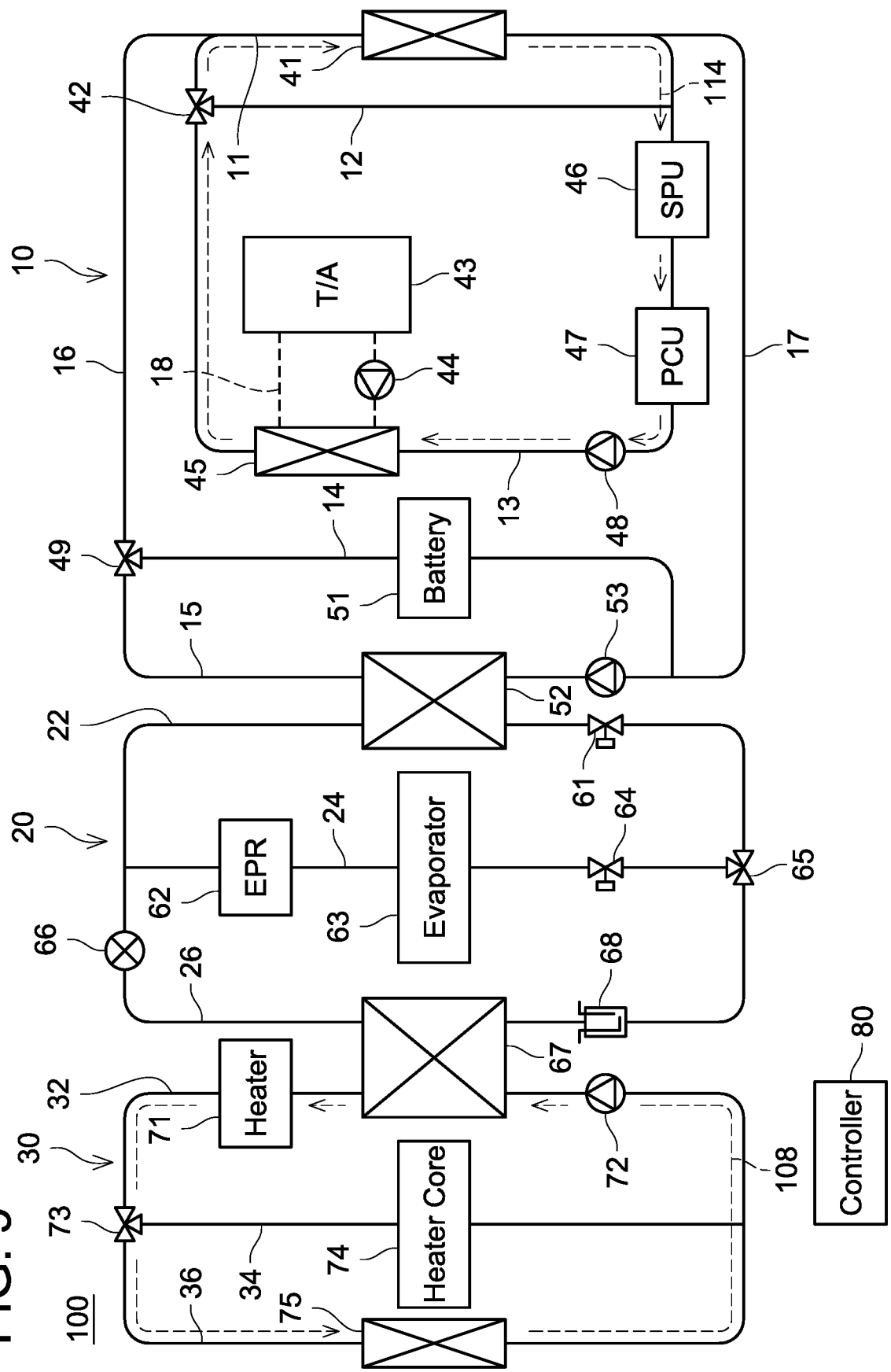
FIG. 9 is a circuit diagram showing a unit-heating operation.

(Unit-Heating Operation) In the unit-heating operation, the controller 80 controls each part of the heat management device 100 as shown in FIG. 9. The second heat circuit 20 is not involved in the unit-heating operation. In the third heat circuit 30, each part operates as in the battery-heating operation. In the first heat circuit 10, the three-way valve 42 is controlled to connect the electrical apparatus passage 13 to the low-temperature radiator passage 11, and the pump 48 operates. The heat medium therefore circulates in the circulation channel 114 configured with the electrical apparatus passage 13 and the low-temperature radiator passage 11. In the unit-heating operation, the oil pump 44 operates and the oil in the oil-circulation path 18 circulates.

In the unit-heating operation, like the battery-heating operation, the heater 71 is operated and the high-temperature heat medium flows into the high-temperature radiator 75. Consequently, as in the battery-heating operation, the heat medium that circulates in the circulation channel 108 is cooled and the heat medium that flows in the low-temperature pipes 208 (i.e., the heat medium that circulates in the circulation channel 114) is heated in the radiator unit 200. In the circulation channel 114, therefore, the high-temperature heat medium heated by the low-temperature radiator 41 flows into the electrical apparatus passage 13, and the SPU 46 and the PCU 47 are thereby heated. The oil cooler 45 heats the oil in the oil-circulation path 18 by the high-temperature heat medium. Consequently, the heated oil heats oil in the transaxle 43 (i.e., oil used for cooling built-in gears). As described above, the unit-heating operation to heat the unit (i.e., the SPU 46, the PCU 47, and the transaxle 43) is executed. The controller 80 may operate the oil pump 44 when the transaxle 43 needs to be heated and not operate the oil pump 44 when the transaxle 43 does not need to be heated.

Moreover, when the temperature of the battery 51 is lower than or equal to the reference value, and the temperature of at least one of the SPU 46, the PCU 47, or the transaxle 43 is lower than or equal to the reference value, the battery-heating operation and the unit-heating operation may be executed successively and alternately. In this case, the controller 80 may switch between the battery-heating operation and the unit-heating operation by switching on and off the pumps 48, 53. Specifically, the battery-heating operation may be executed by operating the pump 53 and stopping the pump 48, and the unit-heating operation may be executed by stopping the pump 53 and operating the pump 48. According to this configuration, warming up the SPU 46, the PCU 47, and the transaxle 43 can prevent a situation in which the SPU 46, the PCU 47, and the transaxle 43 decrease in efficiency due to the SPU 46, the PCU 47, and the transaxle 43 being at low temperatures.

The controller 80 can execute operation(s) other than the above-mentioned operations. For example, the controller 80 can execute air-heating by the heater core 74 by causing the heater 71 to heat the heat medium while circulating the heat medium in the circulation channel 102. This operation is executed when the above-mentioned air-heating operation cannot be executed. Moreover, the controller 80 can execute an operation to prevent temperature rise in the SPU 46, the PCU 47, and the motor by circulating the heat medium in a circulation channel configured with the electrical apparatus passage 13 and the bypass passage 12.

The above-described heat management device 100 can heat the battery 51, the transaxle 43, the SPU 46, and the PCU 47 utilizing heat of the third heat circuit 30 having a relatively high temperature. The heater 71 and the heater core 74 for heating air in the cabin of the vehicle are disposed in the third heat circuit. This enables heating of the heat medium in the first heat circuit 10 by utilizing heat generated in the vehicle, with no use of any heating device, such as a heater, dedicated to heating of the heat medium in the first heat circuit 10.

A temperature of the battery 51 to be reached by being heated could differ from a temperature of each of the transaxle 43, the SPU 46, and the PCU 47 to be reached by being heated. For example, the temperature of the battery 51 to be reached by being heated is lower than that of the transaxle 43. In the above-described heat management device 100, the battery-heating operation and the unit-heating operation are executed by using different circulation channels. Because of this, an amount by which the battery 51 is heated and an amount by which each of the transaxle 43, the SPU 46, and the PCU 47 is heated are separately regulated. Because of this, the battery 51, the transaxle 43, the SPU 46, and the PCU 47 can be respectively heated to more suitable temperatures.

(Corresponding Relationships) The first heat circuit 10 is an example of "first heat circuit", and the third heat circuit 30 is an example of "second heat circuit". The low-temperature radiator 41 is an example of "first radiator", and the high-temperature radiator 75 is an example of "second radiator". The battery 51, the transaxle 43, the SPU 46, and the PCU 47 are examples of "vehicle equipment". The heater core 74 is an example of "heating apparatus", and the heater 71 is an example of "heater".

Specific examples of the present disclosure have been described in detail, however, these are mere exemplary indications and thus do not limit the scope of the claims. The art described in the claims include modifications and variations of the specific examples presented above.

(Variant)

(1) In the above-described embodiment, no heater dedicated to heating of the heat medium in the battery passage 14 is disposed in the battery passage 14. In a variant, however, a heater configured to heat the heat medium in the battery passage 14 may be disposed in the battery passage 14. This heater may be an auxiliary heater used when heating of the battery by the battery-heating operation is insufficient.

(2) In the above-described embodiment, the battery 51, the transaxle 43, the SPU 46, and the PCU 47 are examples of "vehicle equipment". However, the vehicle equipment heated in the vehicle equipment-heating operation may be at least one of the battery 51, the transaxle 43, the SPU 46, or the PCU 47.

(3) In the above-described embodiment, the low-temperature radiator 41 and the high-temperature radiator 75 are integrally disposed as the radiator unit 200 in which the low-temperature radiator 41 and the high-temperature radiator 75 share the fins 204. However, the low-temperature radiator 41 and the high-temperature radiator 75 may include respective fins. As an alternative, the low-temperature radiator 41 and the high-temperature radiator 75 may be disposed as separate bodies spaced apart from each other. Furthermore, the positional relationship between the low-temperature radiator 41 and the high-temperature radiator 75 is not limited to the relation in which the high-temperature radiator 75 is disposed frontward of the low-temperature radiator 41 in the vehicle, but the low-temperature radiator 41 may be disposed frontward of the high-temperature radiator 75 in the vehicle.

Figure 10:
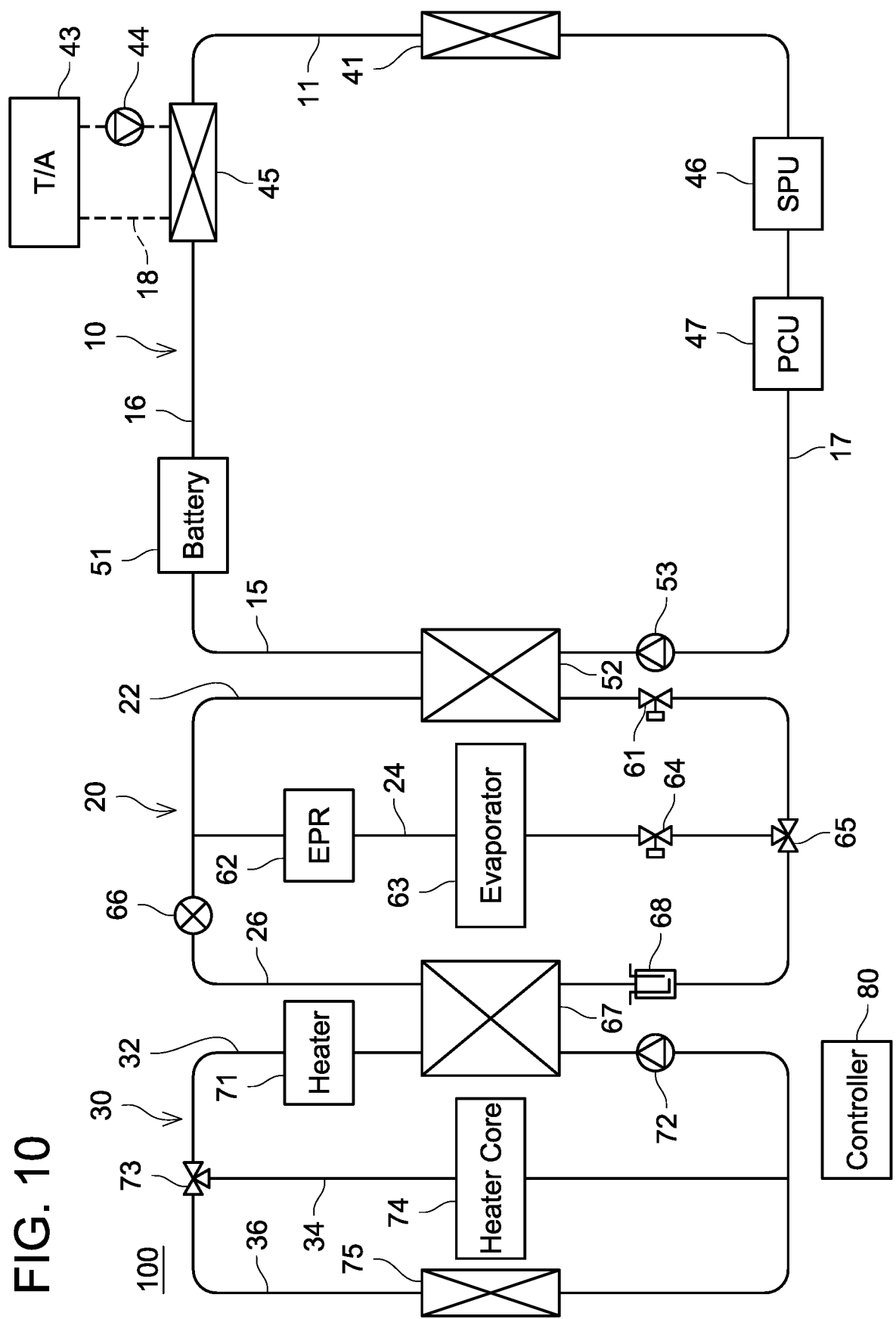
FIG. 10 is a circuit diagram of a heat management device of a variant.

(4) The first heat circuit 10 in the above-described embodiment includes the low-temperature radiator passage 11, the bypass passage 12, the electrical apparatus passage 13, the battery passage 14, the chiller passage 15, the connection passage 16, and the connection passage 17. As shown in FIG. 10, however, the first heat circuit 10 does not need to include the bypass passage 12, the electrical apparatus passage 13, or the battery passage 14. In this case, the chiller 52, the battery 51, the oil cooler 45, the low-temperature radiator 41, the SPU 46, the PCU 47, and the pump 53 may be arranged in series in the first heat circuit 10. In the vehicle equipment-heating operation, the pump 53 may operate and the heat medium may circulate in the low-temperature radiator passage 11, the chiller passage 15, the connection passage 16, and the connection passage 17.

(5) In the above-described embodiment, the three-way valve 49 switches channels to switch states between the state where the heat medium flows from the chiller passage 15 to the battery passage 14 and the state where the heat medium flows from the chiller passage 15 to the connection passage 16. However, the three-way valve 49 may be able to switch channels to switch states among not only the above-described states but also a state where the heat medium flows from the chiller passage 15 to both of the battery passage 14 and the connection passage 16. The three-way valve 49 may be controlled by the controller 80 in the battery-heating operation such that the channel is switched to the state where the heat medium flows from the chiller passage 15 to both of the battery passage 14 and the connection passage 16.

(6) In the above-described embodiment, the heat management device 100 includes the first heat circuit 10, the second heat circuit 20, and the third heat circuit 30. The heat management device 100, however, does not need to include the second heat circuit 20.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A heat management device configured to be mounted on a vehicle, the heat management device comprising:
   a first heat circuit in which first heat medium circulates;
   a second heat circuit in which second heat medium circulates;
   a first radiator disposed in the first heat circuit;
   a second radiator disposed in the second heat circuit; and
   vehicle equipment configured to exchange heat with the first heat medium,
   wherein
   the first radiator and the second radiator are disposed such that the first heat medium flowing in the first heat circuit and the second heat medium flowing in the second heat circuit are able to exchange heat with each other,
   the first heat medium flowing in the first radiator is heated by heat exchange between the first heat medium and the second heat medium in a case where a temperature of the second heat medium flowing into the second radiator is higher than a temperature of the first heat medium flowing into the first radiator,
   the first heat medium heats the vehicle equipment by exchanging heat with the vehicle equipment, and
   the second radiator is disposed frontward of the first radiator in the vehicle.

2. The heat management device of claim 1, further comprising:
   a heater configured to heat the second heat medium; and
   heating apparatus configured to heat air in a cabin of the vehicle using the second heat medium as a heat source.

3. The heat management device of claim 1, wherein the vehicle equipment includes at least one of a transaxle or a battery configured to supply electric power to a motor for driving the vehicle.

* * * * *